United States Patent
Liu

(10) Patent No.: US 7,411,885 B2
(45) Date of Patent: Aug. 12, 2008

(54) METHOD OF DETERMINING THE TIME OF ADJUSTING WRITING STRATEGY OF AN OPTICAL DRIVE

(75) Inventor: Chi-Yuan Liu, Taipei (TW)

(73) Assignee: Lite-On It Corporation, Taipei (TW)

( * ) Notice: Subject to any disclaimer, the term of this patent is extended or adjusted under 35 U.S.C. 154(b) by 609 days.

(21) Appl. No.: 11/075,715

(22) Filed: Mar. 10, 2005

(65) Prior Publication Data

US 2005/0213474 A1    Sep. 29, 2005

(30) Foreign Application Priority Data

Mar. 26, 2004    (TW) .............................. 93108425 A

(51) Int. Cl.
*G11B 7/00* (2006.01)

(52) U.S. Cl. .................................... 369/116; 369/47.53

(58) Field of Classification Search ............... None
See application file for complete search history.

(56) References Cited

U.S. PATENT DOCUMENTS

| | | | | |
|---|---|---|---|---|
| 5,274,622 A | * | 12/1993 | Kono | 369/116 |
| 5,796,704 A | * | 8/1998 | Nanba et al. | 369/53.12 |
| 5,878,015 A | * | 3/1999 | Schell et al. | 369/116 |
| 6,331,966 B1 | * | 12/2001 | Minami et al. | 369/13.07 |
| 6,671,232 B1 | * | 12/2003 | Stupp | 369/13.02 |
| 6,741,529 B1 | * | 5/2004 | Getreuer | 369/30.17 |
| 6,901,039 B1 | * | 5/2005 | Sugie et al. | 369/47.28 |
| 7,126,896 B2 | * | 10/2006 | Miyaki | 369/47.53 |
| 2003/0169659 A1 | * | 9/2003 | Miyaki | 369/47.53 |

* cited by examiner

*Primary Examiner*—Wayne Young
*Assistant Examiner*—Van T Pham
(74) *Attorney, Agent, or Firm*—Bacon & Thomas, PLLC

(57) ABSTRACT

A method of determining the time of adjusting writing strategy of an optical drive. Firstly, relation between an output signal value and an ambient temperature is recorded in a look up table stored in a memory. Then, the output signal value of a compensator can be obtained by looking up the look up table according to the ambient temperature of the optical drive. When the ambient temperature is higher than a predetermined temperature, the optical drive adjusts the writing strategy.

7 Claims, 5 Drawing Sheets

US 7,411,885 B2

METHOD OF DETERMINING THE TIME OF ADJUSTING WRITING STRATEGY OF AN OPTICAL DRIVE

This application claims the benefit of Taiwan application Serial No. 93108425, filed Mar. 26, 2004, the subject matter of which is incorporated herein by reference.

BACKGROUND OF THE INVENTION

1. Field of the Invention

The invention relates in general to a method of controlling an output power of a laser diode in an optical drive, and more particularly to a method of determining the time of adjusting writing strategy of an optical drive.

2. Description of the Related Art

A laser diode of an optical drive is disposed in an optical pickup head to serve as a light source for reading/writing an optical disk. When the optical drive is writing, the laser diode has to continuously output a higher and stabler power. FIG. 1 is a schematic illustration showing a closed-loop control circuit for an output power of a laser diode in an optical drive. First, a DAC (Digital to Analog Converter) 10 receives a digital control signal 12 and converts the digital control signal 12 into an analog control signal 14. An error signal 16, which is obtained by subtracting an analog feedback signal 42 from the analog control signal 14, is inputted to a compensator 20. The compensator 20 can generate an output signal 22, which is outputted to an amplifier 25, according to the error signal 16. Thus, the amplifier 25 can convert the output signal 22 into a driving current 28, which flows to a laser diode (LD) 30. After the LD 30 emits a laser beam 32 according to the driving current 28 and a FMD (Front Monitor Diode) 40 has received the laser beam 32, the FMD 40 outputs the feedback signal 42.

FIG. 2 is a schematic illustration showing the writing strategy for a rewritable-disk in the optical drive. In general, owing to the material property of the recording layer of the rewritable-disk, the EFM (Eight to Fourteen Modulation) signal has to be converted into a pulse-type high-frequency (HF) signal (write power Pw, base power Pb, and erase power Pe), and the HF signal can be used to drive the laser diode to output the pulse-type laser beam. Therefore, the recording information such as pits and lands can be formed on the tracks of the recording layer. For example, the EFM signal is a signal ranging from 3T to 11T according to the specification of the rewritable optical disk. When the EFM signal is 3T, the HF signal has two pulses.

Typically, a temperature sensing element, such as a thermister, is usually disposed in the optical pickup head of the optical drive such that the ambient temperature around the optical pickup head can be monitored momentarily. When the optical drive is executing a writing control, the ambient temperature around the optical pickup head greatly influences the written quality of the optical disk. That is, different writing effects occur when the same HF signal is used to drive the laser diode under the environment of different ambient temperatures. Hence, when the temperature in the optical drive changes, the optical pickup head has to adjust the writing strategy of the optical drive.

The writing strategy adjusting operation enables the optical drive to change the pulse width of the HF signal so as to drive the laser diode and write the optical disk after the temperature in the optical drive is changed. Otherwise, when the temperature in the optical drive is changed but the HF signal for driving the laser diode is not changed correspondingly, the written quality of the optical disk is deteriorated, or the writing operation may fail. In general, as the ambient temperature of the optical drive rises, the pulse width or the write power of the HF signal has to be decreased so that better information may be recorded in the optical disk.

In order to reduce the manufacturing cost of the optical drive, however, no temperature sensing element is disposed in the optical pickup heads of some optical drives. Therefore, it is very important to properly determine the time of adjusting the writing strategy of the optical drive in order to prevent the written quality of the optical disk from being deteriorated or prevent the writing operation of the optical drive from failing when the optical disk is writing.

SUMMARY OF THE INVENTION

It is therefore an object of the invention to provide a method of determining the time of adjusting writing strategy of an optical drive. When an optical pickup head does not include a temperature sensing element, the temperature in the optical drive is obtained according to an output signal value of a compensator, and the writing strategy is adjusted when the ambient temperature reaches a predetermined temperature.

The invention achieves the above-identified object by providing a method of determining time of adjusting writing strategy of an optical drive to control a closed-loop control circuit for controlling an output power of a laser diode. The method includes the steps of: receiving an output signal outputted from a compensator; converting the output signal into an output signal value by way of analog-to-digital conversion; converting the output signal value into an ambient temperature value according to a look up table; and adjusting the writing strategy when the ambient temperature value is higher than a predetermined temperature.

The invention also discloses a method of determining the time of adjusting writing strategy of an optical drive to control a closed-loop control circuit for controlling an output power of a laser diode. The method includes the steps of: receiving an output signal outputted from a compensator; converting the output signal into an output signal value by way of analog-to-digital conversion; and adjusting the writing strategy when the output signal value is greater than an output signal threshold value.

Other objects, features, and advantages of the invention will become apparent from the following detailed description of the preferred but non-limiting embodiments. The following description is made with reference to the accompanying drawings.

DETAILED DESCRIPTION OF THE INVENTION

Because an output power of a laser diode in an optical drive is controlled by the firmware that changes a digital control signal. A DAC (Digital Analog Converter) converts the digital control signal into an analog control signal. Next, a compensator and an amplifier can generate a driving current to drive the laser diode to output a predetermined power. Of course, in order to make the laser diode hold the constant power output, a FMD (Front Monitor Diode) is needed to receive the laser beam outputted from the laser diode and to generate a feedback signal to achieve the object of closed-loop control.

Generally speaking, the output power of the laser diode decreases with the rise of the temperature in the optical drive. So, the output power of the laser diode in the optical drive is controlled in a closed-loop manner, wherein the compensator may be utilized to change the output signal (or driving signal) according to the value of an error signal, such that the stable output of the laser diode meets the output power specified by the digital control signal. That is, in order to make the laser diode hold the stable output power, the output signal outputted from the compensator has to rise with the rise of the ambient temperature.

Figure 1:
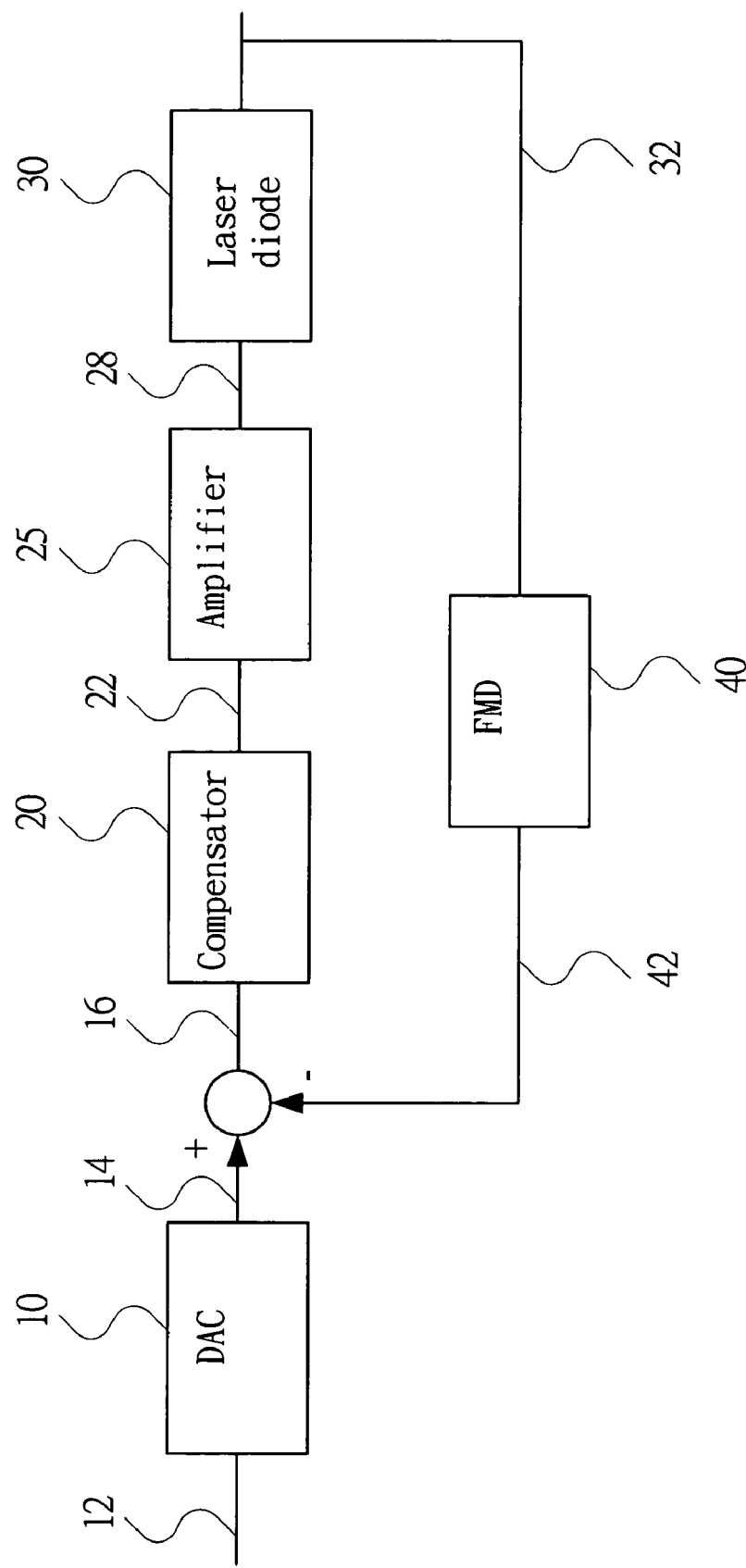
FIG. 1 is a schematic illustration showing a closed-loop control circuit for an output power of a laser diode in an optical drive.
Figure 2:
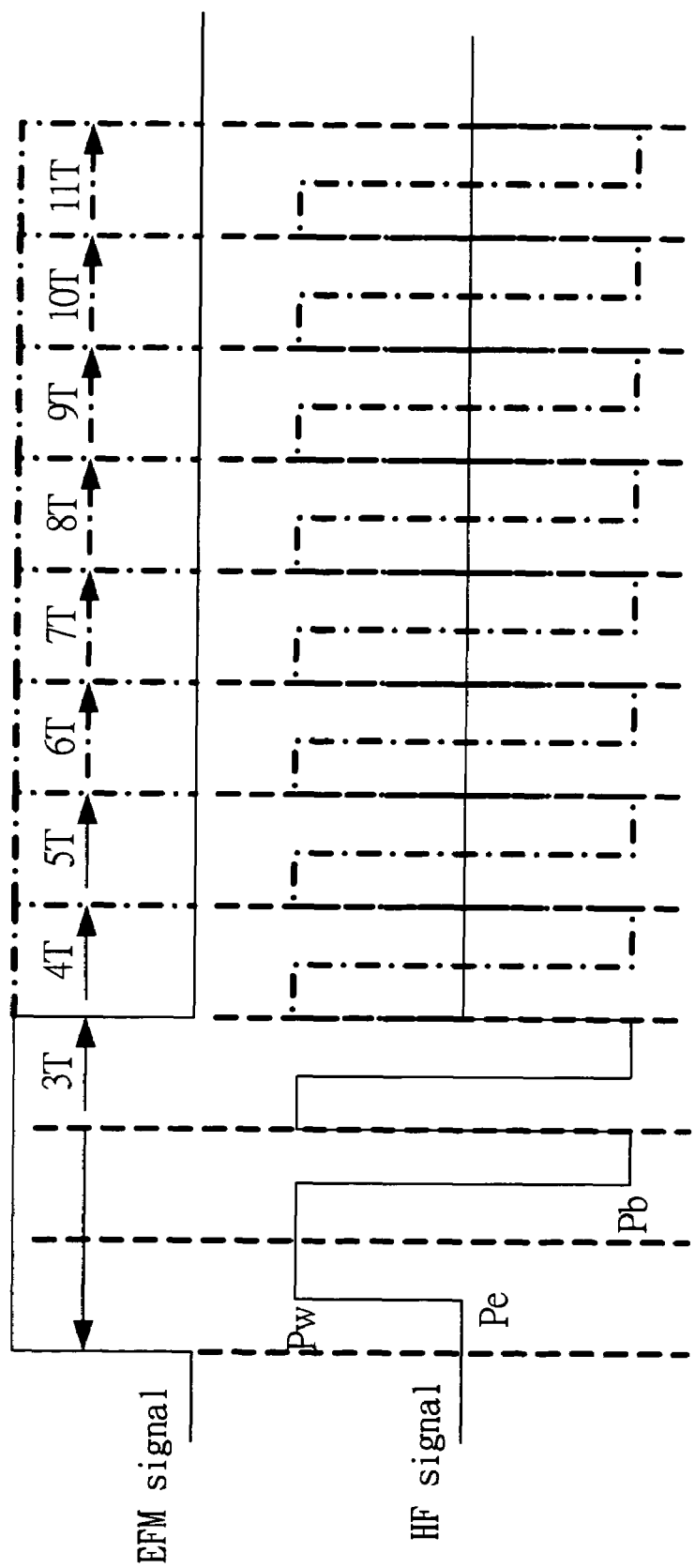
FIG. 2 is a schematic illustration showing the writing strategy for a rewritable-disk in the optical drive.
Figure 3A:
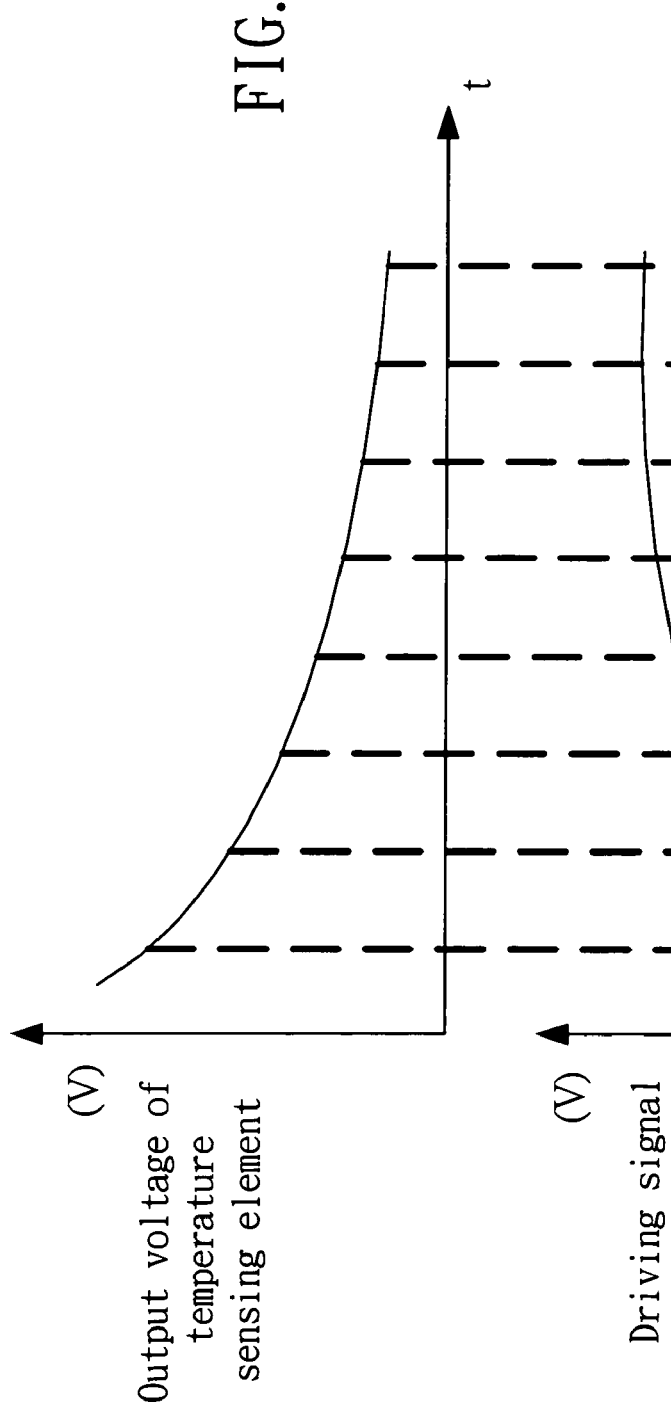
FIGS. 3(a) and 3(b) are schematic illustrations showing an output signal and a temperature signal outputted from a temperature sensing element V.S. the time in the optical drive.
Figure 3B:
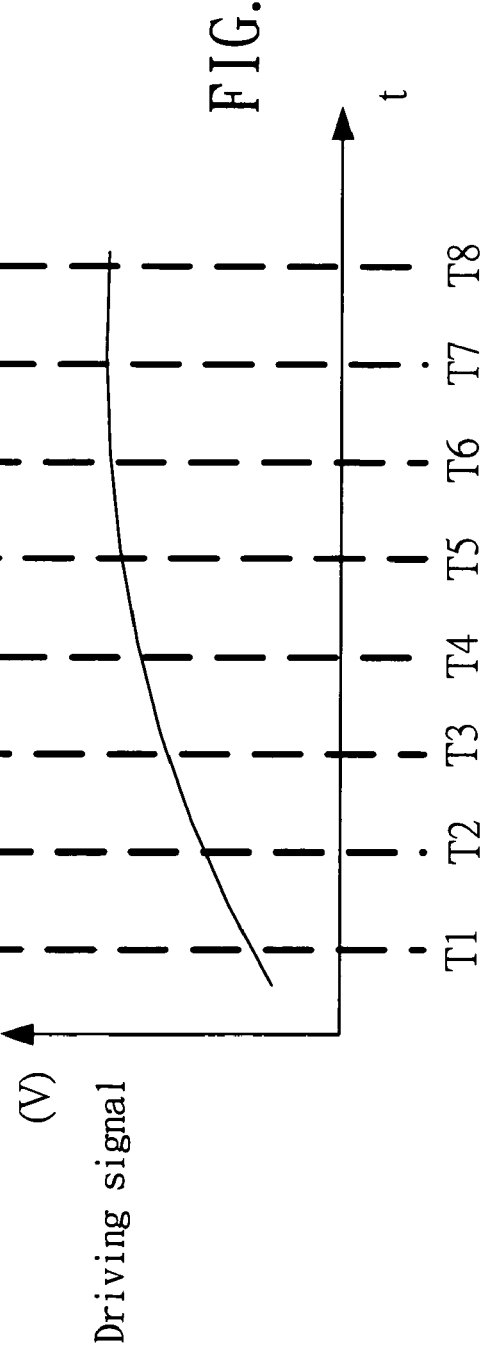

FIGS. 3(a) and 3(b) are schematic illustrations showing the output signal and a temperature signal outputted from a temperature sensing element V.S. the time in the optical drive. When the optical drive is writing, the temperature in the optical drive gradually increases. So, the output voltage value decreases with the rise of the ambient temperature according to the property of the temperature sensing element (e.g., a thermister). Thus, the temperature in the optical drive can be obtained accordingly. Furthermore, because the temperature in the optical drive gradually rises, the output signal outputted from the compensator also increases with the rise of the temperature. Therefore, the relation between the output signal and the ambient temperature (T1, T2, . . . , T8) can be obtained according to the two curves.

Therefore, a look up table may be built in a ROM (Read Only Memory) of the optical drive according to the relation between the output signal and the ambient temperature. The look up table records the relation between the output signal value (or driving signal value) and the ambient temperature. The output signal value may be obtained using an ADC (Analog to Digital Converter) to receive and convert the output signal outputted from the compensator. So, the temperature in the optical drive may be obtained without the need of the temperature sensing element. On the contrary, the temperature in the optical drive may be obtained by utilizing the look up table and momentarily monitoring the output signal value.

Figure 4:
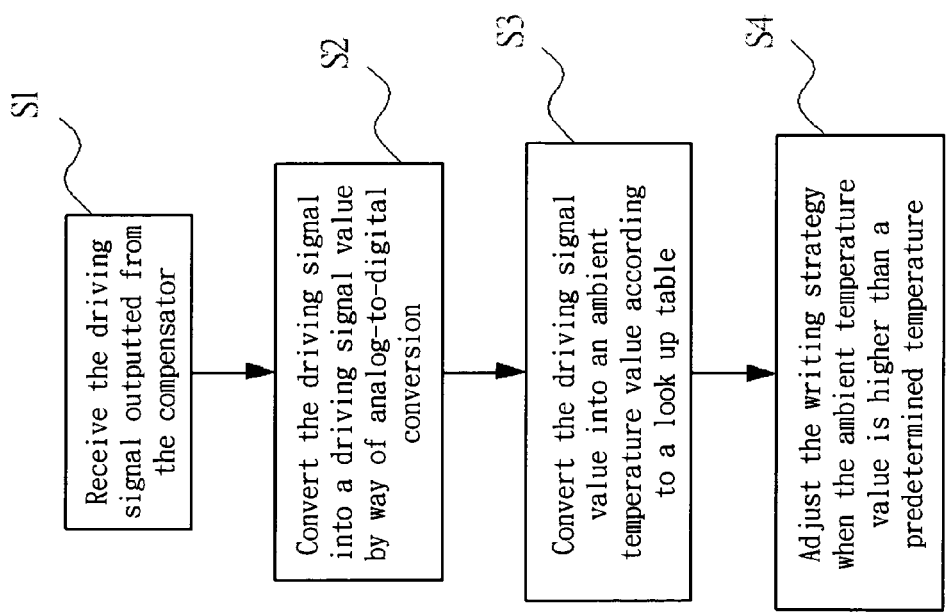
FIG. 4 is a flow chart showing a method of determining the time of adjusting writing strategy of an optical drive of the invention.

FIG. 4 is a flow chart showing a method of determining the time of adjusting writing strategy of an optical drive of the invention. The method includes the following steps.

Step S1 is to receive an output signal of a compensator.

Step S2 is to convert the output signal into an output signal value by way of analog-to-digital conversion.

Step S3 is to convert the output signal value into an ambient temperature value according to a look up table.

Step S4 is to adjust the writing strategy when the ambient temperature value is higher than a predetermined temperature.

Figure 5:
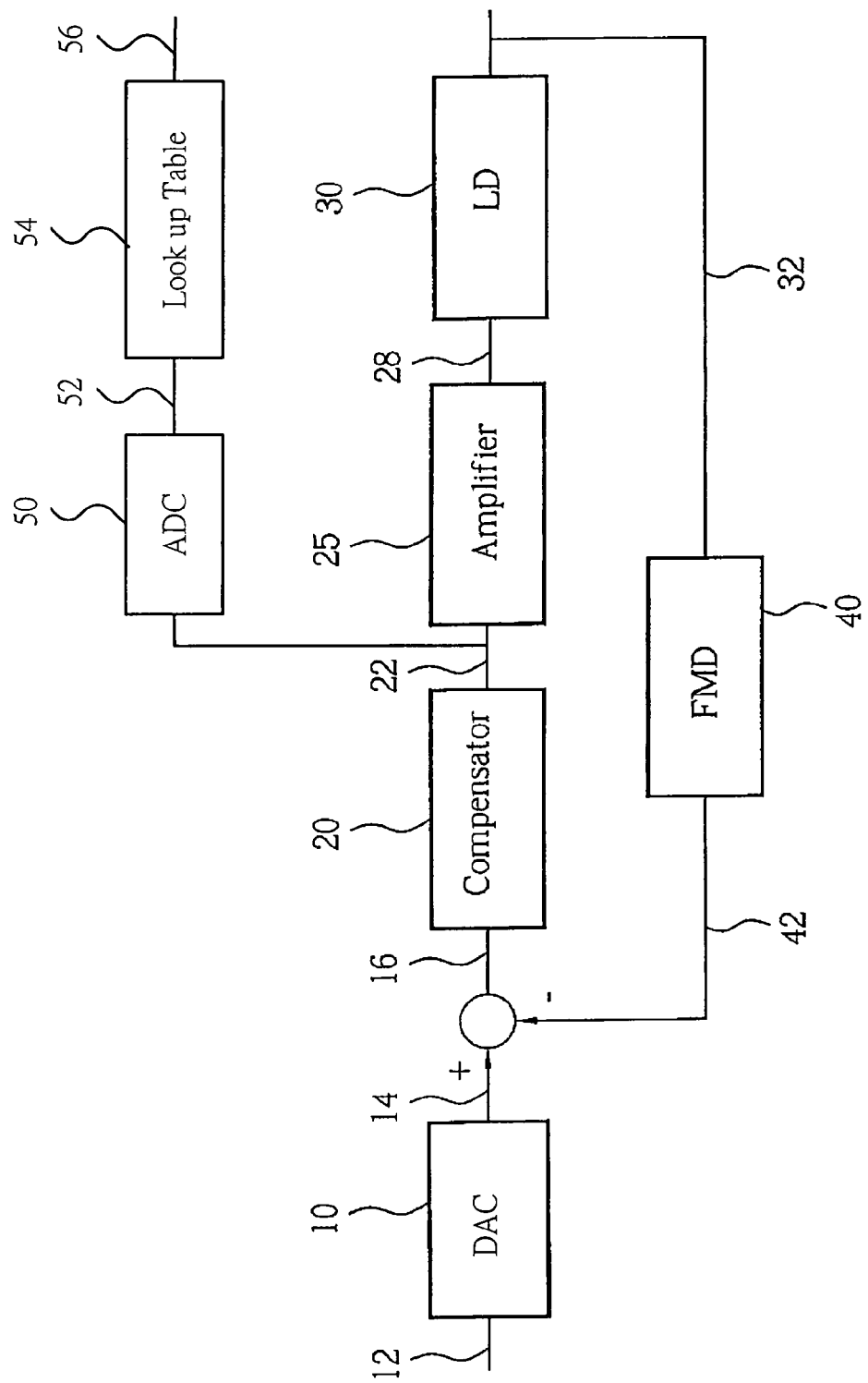
FIG. 5 is a diagram of the control circuit of the present invention.

According to the above-described method, FIG. 5 shows a diagram of the control circuit of the present invention. First, a digital to analog converter (DAC) 10 transforms a digital control signal 12 into an analog control signal 14. An error signal 16 generated by subtracting a feedback signal 42 from the analog control signal 14 is input into a compensator 20. The compensator 20 generates and transmits a driving signal 22 to an amplifier 25 according to the error signal 16. Next, the amplifier 25 transforms the driving signal 22 into a driving current 28 transmitted to a laser diode (LD) 30. The laser diode 30 emits a laser beam 32 according to the driving current 28. After the laser beam 32 is received by a front monitor diode (FMD) 40, the front monitor diode outputs the feedback signal 42. Furthermore, an analog to digital converter (ADC) 50 receives the driving signal 22 from the compensator 20 and transforms the driving signal 22 to a driving signal value 52. A look up table 54, which stores the relationship of the driving signal and the temperature, generates a temperature value 56 according to the received driving signal value 52.

According to the above-mentioned steps, the method of determining the time of adjusting writing strategy of the optical drive utilizes the look up table stored in the memory and the output signal value stored in the look up table to map with the temperature in the optical drive, and adjusts the writing strategy when the temperature of the optical drive is higher than a predetermined temperature.

Furthermore, the invention is not limited to the determination of the operation for the optical drive to execute the writing strategy adjustment by merely converting the output signal value into the ambient temperature value and comparing the ambient temperature value with an ambient temperature. The invention may also have a default output signal threshold value stored in the ROM. In this case, when the output signal value is greater than the output signal threshold value, it represents that the temperature in the optical drive is too high, and the optical drive has to adjust the writing strategy.

Consequently, the advantage of the invention is to provide a method of determining the time of adjusting the writing strategy of the optical drive. According to the invention, the temperature in the optical drive may be obtained without a temperature sensing element disposed in the optical pickup head, and the writing strategy can be adjusted accordingly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of determining time of adjusting writing strategy of an optical drive to control a closed-loop control circuit for controlling an output power of a laser diode, the method comprising the steps of:
   receiving an output signal outputted from a compensator;
   converting the output signal into an output signal value by way of analog-to-digital conversion;
   converting the output signal value into an ambient temperature value according to a look up table; and
   adjusting the writing strategy when the ambient temperature value is higher than a predetermined temperature.

2. The method according to claim 1, wherein the look up table records relation between the output signal value and the ambient temperature value.

3. The method according to claim 1, wherein the look up table is a ROM (Read Only Memory).

4. The method according to claim 1, wherein the closed-loop control circuit comprises:
   a DAC (Digital Analog Converter) for receiving a digital control signal and generating an analog control signal according to the digital control signal;
   the compensator for receiving a difference between the analog control signal and a feedback signal and generating the output signal;

an amplifier for receiving the output signal and outputting a driving current;

the laser diode for receiving the driving current and generating a laser beam; and a FMD (Front Monitor Diode) for receiving the laser beam and then generating the feedback signal.

5. A method of determining time of adjusting writing strategy of an optical drive to control a closed-loop control circuit for controlling an output power of a laser diode, the method comprising the steps of:

receiving an output signal outputted from a compensator;

converting the output signal into an output signal value by way of analog-to-digital conversion; and adjusting the writing strategy when the output signal value is greater than an output signal threshold value.

6. The method according to claim 5, wherein the output signal threshold value is stored in a ROM (Read Only Memory).

7. The method according to claim 5, wherein the closed-loop control circuit comprises:

a DAC (Digital Analog Converter) for receiving a digital control signal and generating an analog control signal according to the digital control signal;

the compensator for receiving a difference between the analog control signal and a feedback signal and generating the output signal;

an amplifier for receiving the output signal and outputting a driving current;

the laser diode for receiving the driving current and generating a laser beam; and a FMD (Front Monitor Diode) for receiving the laser beam and then generating the feedback signal.

* * * * *